(12) United States Patent
Zavadsky et al.

(10) Patent No.: US 12,261,721 B2
(45) Date of Patent: Mar. 25, 2025

(54) SMALL FORM FACTOR WIRELESS COMMUNICATION RELAYS WITH LOW PHYSICAL ISOLATION CONFIGURED FOR ADJACENT CHANNEL AND CO-CHANNEL OPERATION

(71) Applicant: GenXComm, Inc., Austin, TX (US)

(72) Inventors: Dean Zavadsky, Shakopee, MN (US); Daniel B. Schwartz, Scottsdale, AZ (US)

(73) Assignee: GXC, LLC, Austin, TX (US)

( * ) Notice: Subject to any disclaimer, the term of this patent is extended or adjusted under 35 U.S.C. 154(b) by 8 days.

(21) Appl. No.: 18/367,177

(22) Filed: Sep. 12, 2023

(65) Prior Publication Data

US 2024/0089150 A1 Mar. 14, 2024

Related U.S. Application Data

(60) Provisional application No. 63/405,702, filed on Sep. 12, 2022.

(51) Int. Cl.
*H04L 5/14* (2006.01)
*H04B 7/155* (2006.01)
*H04L 25/02* (2006.01)

(52) U.S. Cl.
CPC ..... *H04L 25/0222* (2013.01); *H04B 7/15507* (2013.01)

(58) Field of Classification Search
CPC ....... H04L 5/14; H04L 5/0048; H04L 5/1461; H04L 5/16; H04L 25/0224; H04L 25/03159; H04L 27/2601; H04L 2001/0097; H04B 7/15585; H04B 1/525; H04B 7/0413; H04B 7/026; H04B 7/15542; H04B 7/15528; H04B 7/15564;
(Continued)

(56) References Cited

U.S. PATENT DOCUMENTS 6,810,076 B1 * 10/2004 Tang .................. H04B 3/238
375/232
8,385,818 B2 2/2013 Gore et al.
(Continued)

OTHER PUBLICATIONS

International Search Report and Written Opinion for International application No. PCT/US23/32481 mailed Jan. 23, 2024, 7 pages.

*Primary Examiner* — Eva Y Puente
(74) *Attorney, Agent, or Firm* — Brownstein Hyatt Farber Schreck, LLP (57) ABSTRACT

A wireless communications relay includes a first radio and a second radio operating over adjacent channels. A baseband signal to be transmitted (the "transmit signal") from the first radio is split along two paths. A first path is delayed by a delay element and the second path is provided as input to a channel model configured to implement a transfer function approximating an echo channel of the local RF environment. The channel model outputs a baseband approximation of echo channel effects of the transmit signal, after which an RF chain modulates the echo channel approximation to the RF domain. This RF echo channel approximation is thereafter filtered by an RF band pass filter turned to an operating channel of the second radio. The filtered signal is thereafter combined with received signal to compensate for self-interference.

20 Claims, 8 Drawing Sheets

(58) Field of Classification Search
CPC .... H04B 7/2606; H04W 52/46; H04W 88/04; H04W 84/047; H04W 40/22; H04W 24/02; H04W 72/23; H04W 12/02; H04W 52/243; H04W 72/541
USPC .......................................................... 375/262
See application file for complete search history.

(56) References Cited

U.S. PATENT DOCUMENTS

| | | | |
|---|---|---|---|
| 8,457,021 | B2 | 6/2013 | Schiff |
| 8,559,485 | B2 | 10/2013 | Maca |
| 8,630,211 | B2 | 1/2014 | Gainey et al. |
| 9,713,019 | B2 | 7/2017 | Negus et al. |
| 10,826,559 | B2 * | 11/2020 | Nuzman ................ H04B 1/12 |
| 11,012,144 | B2 * | 5/2021 | Khandani ............ H04B 7/1555 |
| 2009/0135945 | A1 * | 5/2009 | Lee ......................... H04B 7/04 375/285 |
| 2009/0215390 | A1 * | 8/2009 | Ku ..................... H04B 7/15585 455/23 |
| 2010/0285735 | A1 | 11/2010 | Gore et al. |
| 2011/0085477 | A1 | 4/2011 | Schiff |
| 2011/0249708 | A1 | 10/2011 | Maca |
| 2012/0002586 | A1 | 1/2012 | Gainey et al. |
| 2015/0230105 | A1 | 8/2015 | Negus et al. |
| 2019/0044555 | A1 * | 2/2019 | Hewavithana ...... H04L 12/2801 |
| 2020/0343934 | A1 * | 10/2020 | Weissman ........... H04B 1/0032 |
| 2021/0203471 | A1 * | 7/2021 | Lee ...................... H04L 5/1461 |

* cited by examiner

SMALL FORM FACTOR WIRELESS COMMUNICATION RELAYS WITH LOW PHYSICAL ISOLATION CONFIGURED FOR ADJACENT CHANNEL AND CO-CHANNEL OPERATION

CROSS-REFERENCE TO RELATED APPLICATION(S)

This application is a nonprovisional of, and claims the benefit under 35 U.S.C. 119(e) to U.S. Provisional Patent Application No. 63/405,702, filed Sep. 12, 2022, and entitled "Intra-band Wireless Relay Sensitivity Enhancements," the contents of which are incorporated herein by reference as if fully disclosed herein.

TECHNICAL FIELD

Embodiments described herein relate to wireless relay systems, and in particular, to relay systems with radio modules operating in adjacent channels that incorporate self-interference cancellation subsystems.

BACKGROUND

Wireless communication devices can include a transmitter and a receiver configured for simultaneous operation. Problematically, in many environments, reflection(s) of transmitted signals can become incident upon a receiver, interfering with its operation.

Some devices physically isolate transmit antennas from receiver antennas. Some devices enforce time division spectrum sharing. Some devices, by design, only support transmitters and receivers operated in non-adjacent bands. Some more sophisticated devices incorporate self-interference cancellation subsystems that tap transmitter antenna feeds and delay, invert, and/or attenuate those signals before combining the same with output captured by receiver antennas.

However, each conventional solution is suboptimal. In particular, physical isolation is not always practical or possible nor is limiting operation to only particular communication bands. In addition, time division multiplexing reduces maximum throughput. Finally, high frequency signal processing subsystems often required for RF domain self-interference cancellation are often undesirably expensive to manufacture and/or operate and typically consume significant power in operation.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to systems and methods for cancelling self-interference in wireless communications systems. Specifically, embodiments described herein relate to small form factor (e.g., low physical isolation between transmit and receive antennas) wireless communications relays configured for operation in adjacent bands.

In particular, embodiments described herein relate to wireless communication relays (or other wireless communication devices) that include at least two radio systems. For simplicity of description, the embodiments herein are described with reference to a first radio and a second radio. The first radio and the second radio each include at least one transmitter and at least one receiver. Each respective transmitter and receiver can, in turn, be associated with one or more antennas. In some implementations, although not required of all embodiments, a transmitter and a receiver can share the same antenna, access to which can be facilitated by modifying a state of a controllable RF switch on a schedule defined at least in part by one or more time division multiplexing techniques.

In one example, a wireless communication relay as described herein can be used to communicably couple local wireless subnetworks to backhaul (also referred to as core networks). For simplicity of description, many embodiments described herein reference a construction in which a wireless communication relay provides private cellular service to a region and, additionally, wirelessly communicably couples to one or more other networks (which may include the open internet, a public switched telephone network, a private intranet, or other public or private network). In this manner, a wireless communication relay can be configured to communicably couple user equipments ("UE") in the service region to core networks.

In one example, a wireless communication relay as described herein may be deployed in a warehouse environment in which public cellular networks may not reliably function and/or may not provide suitable information or access security controls. In this example, a first radio of the wireless communication relay provides private cellular service access to user equipments within the warehouse, while a second radio communicably couples to a public cellular network external to the warehouse thereby bridging communications between user equipments within the warehouse to core networks. In an implementation of this example, the first radio may be understood to support a private cellular network small cell ("SC") and the second radio may be understood to support communications with other customer premises equipment ("CPE"), or, in other embodiments a gateway device in turn coupled via backhaul to a core network. For simplicity, in some examples, the first radio may be referred to as an SC radio and the second radio may be referred to as a gateway radio. In other embodiments, the terms first radio and second radio may be used.

It may be appreciated by a person of skill in the art that for a conventional wireless communication relay simultaneous operation of the first radio and the second radio may interfere. Specifically, when transmit intervals of the first radio overlap with receive intervals of the second radio and likewise the inverse. In these conditions, transmitted signals can be incident upon receive antennas, often overpowering any recoverable signal with noise.

Furthermore, it may be appreciated by a person of skill in the art that coordinated timing of transmit and receive intervals between the first radio and second radio (so as to prevent overlap) may not be possible in most deployments specifically because the first radio and the second radio are likely to be required to adhere to different transmit/receive interval schedules and/or requested transmit/receive windows that are each respectively defined by external systems and informed by local environmental conditions, communication channels, behavior and/or requirements of other local UE, uplink or downlink bandwidth requirements, and so on.

These constraints may be especially difficult to account for when a deployment also requires (1) a small form factor for a wireless communication relay, thereby eliminating the possibility of physically isolating the first radio from the second radio, and (2) that a utilized band supported by the first radio is adjacent to a utilized band supported by the second radio. Combining these additional design constraints with foregoing described lack of control over transmit interval scheduling results in compounding challenges that conventional wireless communication relays have yet to overcome. Such constructions may be referred to as small form factor wireless communication relays, with low isolation, configured for adjacent channel operation.

Embodiments described herein relate to small form factor wireless communication relays, with low isolation, configured for adjacent channel and/or co-channel operation and account for the foregoing described limitations by incorporating into the wireless communication relay a symmetric self-interference cancellation ("SIC") subsystem that leverages detected channel characteristics/parameters to generate a baseband approximation of self-interference.

This baseband self-interference signal can thereafter be modulated to the RF domain via a dedicated radio frequency modulation or demodulation component chain ("RF chain"). Thereafter, the RF self-interference signal can be filtered via an RF band pass filter to extract frequency components of the RF self-interference signal that overlap with a receive band of a non-transmitting radio associated with the same wireless communications relay. In another phrasing, the RF self-interference signal may be filtered to only the band of interest (as defined by a non-transmitting, receive mode radio) such that the RF self-interference signal does not, itself, contribute additional unnecessary noise to the system.

The filtered RF self-interference signal can be combined with (i.e., subtracted from) signals received by a non-transmitting radio, thereby improving the signal to noise ratio of that non-transmitting radio. In this manner, the filtered RF self-interference signal that is combined with receive signals received by a non-transmitting radio can be referred to as an echo channel self-interference cancellation signal. The operation of removing echo channel self-interference can be referred to herein as echo channel self-interference cancellation or "echo channel SIC."

In addition to echo channel SIC, embodiments described herein additionally provide for direct (e.g., zero phase shift) cancellation/subtraction of transmitted signals from received signals. In a simpler phasing, a transmit antenna feed line can tapped and the resulting signal can be directly subtracted from received signals in the RF domain or in the BB domain. Such signals can be referred to as direct self-interference cancellation signals or direct SIC signals. The operation of removing direct self-interference can be referred to herein as direct self-interference cancellation or "direct SIC."

By combining benefits of echo channel SIC and direct SIC, receive performance of non-transmitting radios in wireless communications relays as described herein is dramatically improved.

These foregoing and other embodiments are discussed below with reference to FIGS. 1-8. However, those skilled in the art will readily appreciate that the detailed description given herein with respect to these figures is for explanation only and should not be construed as limiting.

Figure 1:
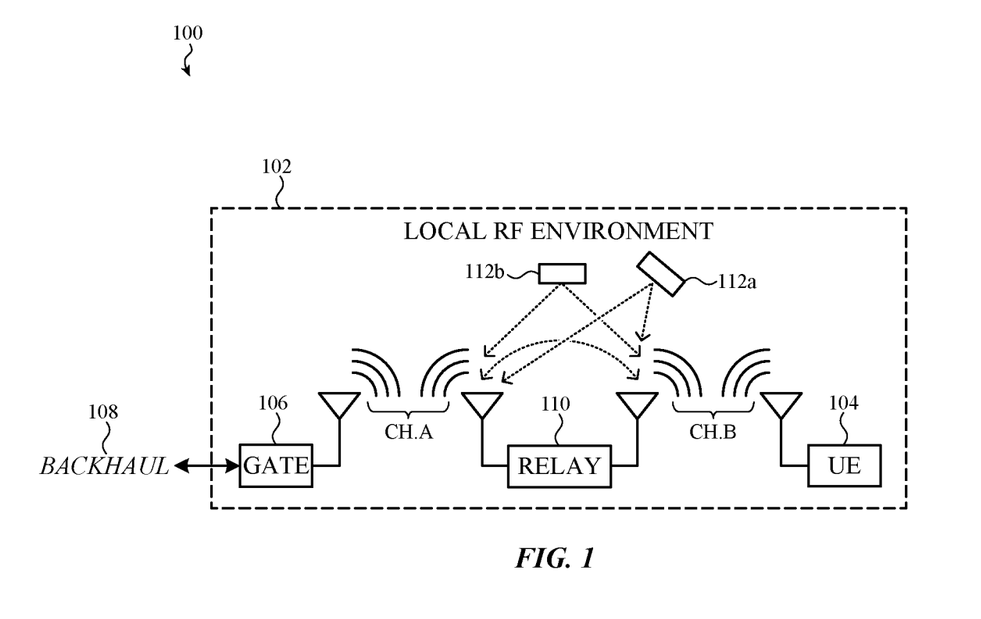
FIG. 1 depicts a wireless communications relay, such as described herein.

FIG. 1 depicts a wireless communications relay, such as described herein. In particular, the illustration depicts a wireless communications system 100 operating in a local RF environment 102.

The local RF environment 102 may be any radio environment; for simplicity of illustration and description, the local RF environment 102 may be within a building or large structure, such as a warehouse, mine, and the like. These are merely examples; the local RF environment 102 may be any suitable environment.

The local RF environment 102 includes a user equipment 104 that wirelessly communicates with a gateway device 106 that, in turn, is communicably coupled via a backhaul 108 to one or more core networks. This topology facilitates wireless communication within the local RF environment 102 between the user equipment 104 and the core network(s).

The user equipment 104 can be any suitable portable or stationary user equipment device. In some cases, the user equipment 104 is a cellular phone or wearable device whereas in other embodiments the user equipment 104 is a Wi-Fi capable device. The user equipment 104 may be a stationary electronic device, such as warehouse equipment or manufacturing appliances or controls. For simplicity of description, the user equipment 104 may be presumed to be a cellular capable device such as a cellular phone, although it may be appreciated that this is merely one example.

In some constructions the user equipment 104 can be directly communicably coupled to the gateway device 106, but this may not be possible in all constructions. As a result, many embodiments include a wireless communications relay 110 as described herein. The wireless communications relay 110 can be configured with multiple radios, each of which is configured to conform to one or more wireless communication protocols. A first radio of the wireless communications relay 110 can be configured to communicably couple to the user equipment 104 and a second radio of the wireless communications relay 110 can be configured to communicably couple to the gateway device 106.

In some deployments, the first and second radios of the wireless communications relay 110 are configured to operate in non-overlapping bands. In these examples, self-interference is likely to be minimal and thus any self-interference cancellation circuitry or processing components may be disabled to save power.

However, as noted above, the first and second radios of the wireless communications relay 110 can be configured to operate in adjacent or overlapping bands. In these examples, a first radio can be configured in one transmit interval to transmit over a first channel while a second radio is configured to receive over a second channel close in spectrum to the first channel. In the illustrated example, the gateway device 106 communicates with the wireless communications relay 110 via Channel A and the user equipment 104 communicates with the wireless communications relay 110 over Channel B.

Due to spectral proximity of Channel A and Channel B, the first radio and the second radio may mutually interfere as a result of reflections within the local RF environment 102, such as reflections from a reflective object 112a, or 112b. Reflections from these reflective objects 112a, 112b within the local RF environment 102 cooperate to introduce self-interference incident upon the first radio (when transmitting from the second radio) and self-interference incident upon the second radio (when transmitting form the first radio). More specifically, sideband content of Channel A when a radio transmitting in Channel A may overlap with Channel B and likewise the inverse.

It may be appreciated that "adjacent" as used herein in respect of communication channels defined by center frequencies/carriers, can vary from embodiment to embodiment and implementation to implementation. More generally and broadly, a first channel may be considered adjacent to a second channel if a nontrivial sideband power of the first channel overlaps with the second channel; as may be appreciated, standard-defined channel separations can inform whether overlap/interference is more or less likely to occur. In many cases, as may be appreciated by a person of skill in the art, standards-defined channels often overlap one another by design. As such, as used herein the term "adjacent" channels may be understood to be relative to a particular pair of communication standards supported by a given wireless communications relay and, in respect of those standards, whether the channels (carriers) and the bandwidth supported therein are likely to induce nontrivial sideband power overlaps necessitating or motivating self-interference cancellation.

Further, it may be appreciated that embodiments described herein can be leveraged in co-channel deployments as well. For simplicity of description, the embodiments that follow reference adjacent channel deployments, but it is appreciated that this is merely one example.

As a simple example, a first communication standard may define ten usable channels separated by 25 MHz, starting at approximately 2.4 GHz (or 2400 MHz). A second communication standard may define ten usable channels separated by 100 MHz starting approximately at 2.5 GHz or 2500 MHz. In this example, among several channel overlaps, it may be appreciated that the first channel of the second communication standard overlaps at least in part several higher-index channels of the first communication standard.

For example, when a first radio transmitting over Channel 10 of the first communication standard, that transmission is incident upon a second radio receiving over Channel 1 of the second communication standard, constituting noise therefor. Similarly, as the second radio transmits over Channel 1 of the second communication standard as the first radio enters a receive interval in Channel 10, the second radio's transmissions constitute noise and interference in respect of the first radio. For configurations in which the first radio and the second radio are components of the same wireless communications relay (such as the wireless communications relay 110), or otherwise co-located or associated with the same communication system or network, these overlapping transmissions constitute direct self-interference.

In addition, as noted above, each transmission in an overlapping or adjacent band can also induce echo channel-self-interference. Specifically, as the first radio transmits into a local RF environment (e.g., the local RF environment 102) in a selected channel conforming to a first communication standard, that transmission can be reflected by one or more reflective surfaces within that environment (e.g., the reflective objects 112a, 112b). Some of these reflections may, at different relative delays and attenuations, become incident upon the second radio interfering with its operation.

The wireless communications system 100 can be configured to operate within the local RF environment 102 in adjacent bands. For example, the gateway device 106 can be configured to operate according to a first protocol or standard that leverages Channel A and the user equipment 104 can be configured to operate according to a second protocol or standard that leverages Channel B, which may at least partially overlap with Channel A.

To minimize self-interference induced by transmit intervals in Channel A and Channel B, the wireless communications relay 110 can include a self-interference cancellation system as described herein.

More generally, the wireless communications relay 110 includes a self-interference cancellation system configured to generate channel-specific interference cancellation signals (also referred to as blocking signals) that can be combined with signals received by receive-interval configured radios to cancel (substantively attenuate) components of self-interference that overlap with the receive channel.

For example, consider a deployment of the wireless communications system 100 in which Channel A and Channel B are adjacent channels. In this example, when a first radio of the wireless communications relay 110 is transmitting on Channel A to communicate with the gateway device 106 and a second radio of the wireless communications relay 110 is receiving on Channel B to communicate with user equipment 104, both echo channel self-interference and direct self-interference can be incident upon the second radio. More specifically, some nonzero portion of Channel A sideband overlaps with Channel B, introducing self-interference noise both directly and within the echo channel defining the local RF environment 102.

Direct self-interference can be canceled or substantially mitigated by tapping the transmitted signal prior to transmission so as to subtract that signal from received signals. The nonzero portion of sideband power introduced to the local RF environment 102 by transmitting on Channel A and reflected back to the second radio, however, can be canceled by operation of a self-interference cancellation subsystem within the wireless communications relay 110.

The self-interference cancellation subsystem can be configured to leverage a channel model to generate a baseband signal that approximates the echo channel self-interference resulting from transmitting a particular signal on Channel A into the local RF environment 102. This baseband self-interference approximation signal can thereafter be shifted to RF domain by a dedicated RF chain tuned to Channel A. Once in the RF domain, the self-interference cancellation signal can be band pass filtered by an RF filter tuned to Channel B. In this manner, the SIC interference signal generated by operation of the channel model is band limited only to the band of interest, namely, Channel B. In a simpler phrasing, although the real echo channel self-interference signal is broad spectrum, the only portion of that signal that interferes with operation of the second radio is that portion that overlaps Channel B. Thus, the only portion of echo channel self-interference that should be approximated (by operation of the self-interference cancellation subsystem and the channel model) is that portion which overlaps with Channel B. By rejecting all other spectral content of the approximation of the echo channel (via band pass filtering), the wireless communications relay 110 reduces the likelihood that operation of the self-interference cancellation subsystem introduces additional noise.

The channel model can be implemented in a number of suitable ways. In some cases, the channel model can be implemented by configuring a field programmable gate array. In other cases, the channel model can be implemented either partially or entirely in software, such as by cooperation of a processor and a memory. In particular, the processor can be configured to load from the memory one or more instructions that, when loaded by the processor, cause the processor to instantiate an instance of software that includes functional elements that perform, coordinate, or execute one or more operations of a channel model as described herein. For simplicity of description, some embodiments described herein include a processor that is at least partially dedicated to implementing a channel model. Many constructions are possible.

Once the RF domain SIC signal is band pass filtered, it can be coupled into received signals thereby attenuating the real echo channel self-interference introduced by the local RF environment 102.

The self-interference cancellation subsystem can be configured in a number of ways to perform the above described function of leveraging a channel model to generate a baseband approximation of echo channel interference, modulating that baseband approximation to RF in Channel A, filtering the resulting RF signal by a band pass filter tuned to Channel B, and injecting the resulting filtered RF domain SIC signal into received signal chains. Similarly, a number of suitable filters, RF elements, modulators, delay elements and so on may be included in different embodiments.

In many constructions, the self-interference cancellation subsystem of the wireless communications relay 110 as described herein splits a baseband signal to be transmitted by a radio operating in a transmit mode along two paths. A first path is delayed by a fixed or variable amount before being provided as input to a first RF chain feeding one or more corresponding transmit antennas. A second path provides the baseband transmit signal as input to a channel model (which may also be referred to as an "echo channel matrix"). The delay introduced to the first path is selected to compensate for processing delays incurred by passing the second path baseband signal through the channel model.

The channel model includes a discrete transfer function describing and/or approximating RF domain effects attributable to the local RF environment 102 in respect of a particular communication channel (e.g., carrier frequency), in this example Channel A. The channel model may store multiple channel parameters or configurations, each of which may be specific to particular carrier frequencies (e.g., Channel A, Channel B). In other cases, a single model may be used for multiple frequencies.

In this manner, applying the transfer function to an input baseband signal (a signal to be transmitted) results in a baseband output that approximates effects that would be imparted by the local RF environment were that baseband signal to be modulated to the selected carrier frequency (the "channel"), fed to an antenna, radiated into the local RF environment 102, and at least partially reflected back to the antenna thereafter being received and demodulated back to baseband. As may be appreciated, the baseband signal provided as output by the channel model may be referred to as a "baseband echo channel self-interference signal."

The channel model approximates effects of a nonzero and noninfinite number of reflections from objects within the local RF environment 102. As a result and as noted above, passing a baseband signal to be transmitted through the channel model causes to be produced, as output, a second baseband signal that approximates echo channel self-interference attributable to that particular transmitted signal. Also as noted above, this self-interference BB signal can thereafter be modulated into the RF domain and combined with signals received by other radios of the same wireless communication relay to effect echo channel self-interference cancellation therein.

This topology provides several advantages. For example, the channel model is computationally efficient, as it operates in the discrete domain and in baseband. Further, this topology does not require RF domain signal processing or modification, substantially reducing complexity and operational cost. Further, as a result of fewer RF domain processing elements, self-interference cancellation functionality can be quickly and efficiently enabled and disabled for power savings. In addition, as noted above, these architectures can be implemented in environments in which limited or no shielding or other isolation (e.g., physical isolation) is possible between radios or antenna groups. As a result, overall equipment footprint can be dramatically reduced, and multiple wireless communication relays (such as the wireless communications relay 110) can be deployed in a single environment without particular attention to placement.

Further still, because embodiments described herein leverage channel models operating in baseband, upgrades to already-deployed relays can be dramatically simplified, as control electronics and processors may be upgradable/replaceable without a need for replacement of RF chains, antenna arrays, or other components.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
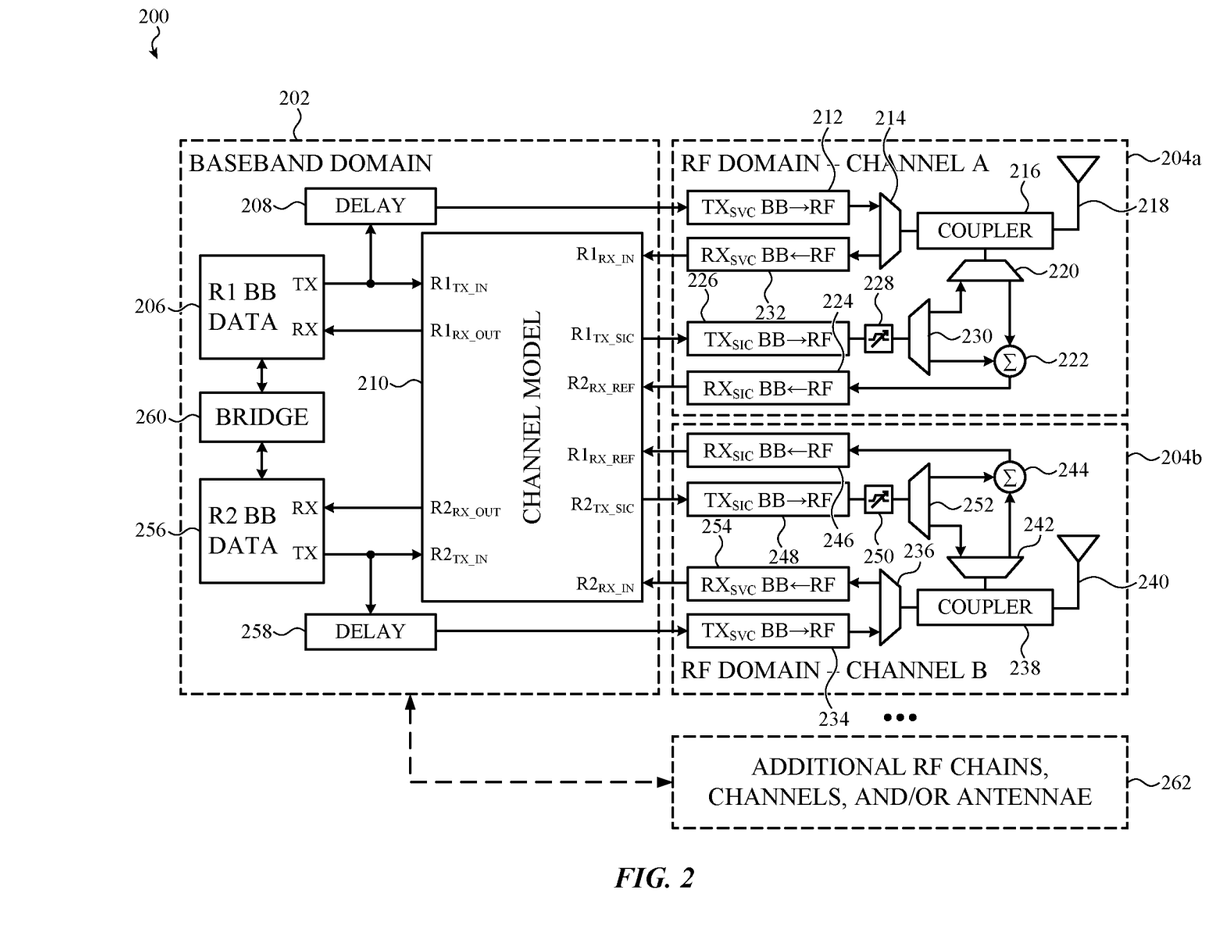
FIG. 2 is a system diagram of a wireless communications relay, as described herein.

FIG. 2 depicts a simplified system diagram of a wireless communications relay, as described herein. The wireless communication relay can facilitate communication between user equipment and core networks, participate in a mesh network, or may be configured for another purpose.

The wireless communications relay 200 can include a housing that encloses, supports, and/or protects one or more components of multiple radios. The housing can be formed from any suitable material including plastic or metal. The housing can include structural features necessary for supporting one or more antennas associated with the one or more radios. The housing can have a small size form factor with each volumetric dimension (length, width, height, radius, and the like) being less than 100 cm. In some embodiments, the housing can be implemented with a size in which each volumetric dimension is less than 50 cm. Different embodiments can be implemented with different dimensions.

The wireless communications relay 200 includes components that operate in the baseband domain 202 and within two or more RF domains. In particular, a first and second RF domain are illustrated as the RF domain 204a the RF domain 204b. The RF domain 204a may be associated with a first channel, Channel A, and the RF domain 204b may be associated with a second channel, Channel B. As with other embodiments described herein, Channel A and Channel B may be adjacent channels. The standards or protocols defining Channel A and Channel B may vary from embodiment to embodiment; in many cases, each Channel conforms to a cellular communications protocol or standard, although this is not required of all embodiments.

As with other embodiments described herein the wireless communications relay 200 includes a first radio and a second radio. The first radio, in the illustrated embodiment, is configured to transmit and/or receive over Channel A (as a simplified example; a person of skill in the art appreciates that many standards transmit and receive over different channels, multiple channels simultaneously, a pattern of channels in a sequence and so on) whereas the second radio is configured to transmit and/or receive over Channel B.

The first radio includes a buffer 206 or other data store configured to receive, store, and output data associated with the first radio's operation. The data may be digital data received when the first radio is in a receive mode and/or digital data enqueued to be transmitted when the first radio is in a transmit mode. As may be appreciated, the buffer 206 can be implemented in a number of suitable ways; generally and broadly, however, the buffer includes inputs and outputs configured for exchanging digital information serially or via a parallel interface.

In a transmit mode, the buffer 206 is configured to provide a digital data stream as output. This data stream can be appropriately encoded or otherwise prepared for subsequent modulation and transmission. In the transmit mode, output of the buffer 206 is split along two paths. A first path is provided to a delay block 208 and a second path is provided to a channel model 210.

As with other embodiments described herein, the channel model 210 implements a discrete representation of a transfer function corresponding to a current state of a local RF environment into which signals may be broadcast by the wireless communications relay 200.

The delay block 208 is tuned to introduce a delay to the first path that substantially duplicates the processing time incurred by the channel model 210. In this manner, output of the channel model 210 and output of the delay block 208 are, ideally, precisely in phase relative to one another. The delay block 208 can be configured in a number of suitable ways. in some cases, the delay block 208 is a configurable delay element, whereas in others a fixed delay may be suitable.

Once delayed, output of the delay block 208, still within the baseband domain 202, is provided as input to an RF chain 212 that filters, encodes, encrypts, modulates, or otherwise suitably prepares the baseband signal to transmission into the local RF environment. More simply, the RF chain 212 transitions the baseband output of the delay block 208 from the baseband domain 202 to the RF domain 204a.

Output of the RF chain 212 can pass optionally through a bidirectional switch element 214 (optional in some embodiments), before being provided as input to a coupler 216 that in turn is conductively coupled to a feed line of an antenna or antenna array. For simplicity of illustration, a single antenna is depicted (the antenna 218), but it may be appreciated that any number of antennas or antenna arrays may be selected in some embodiments. As a result of this construction, the antenna 218 transmits an RF domain signal along Channel A that corresponds to data output from the buffer 206.

The coupler 216 also serves as a tap within the RF domain 204a of signals broadcast by and transmitted from the antenna 218. The tapped signal, as noted above, corresponds to an RF domain expression of direct self-interference and can be used to cancel/attenuate the same.

In particular, the tapped signal obtained from a secondary output of the coupler 216 can be provided as input (optionally) to a bidirectional switch element 220 that controllably directs the tapped signal toward an RF combiner 222. A secondary input of the RF combiner 222 may be configured to receive an RF domain expression of echo channel self-interference. In this manner, output of the RF combiner 222 can be considered a self-interference signal accounting for and/or otherwise representing the combination of direct interference and echo channel interference.

The combined SIC signal output by the RF combiner 222 can be provide as input to an RF chain 224 for conversion back to the baseband domain 202. The BB expression of combined direct interference and echo channel interference can in turn be provided to the channel model 210 as a reference signal representing expected self-interference that may be incident upon the second radio of the wireless communications relay 200. This reference signal can be compared against actually-received signals received by the second radio so that the channel model can update internal parameters to more closely approximate echo channel interference. In this manner, channel approximation (and self-interference cancellation) may improve over time as the channel model continually receives feedback.

As with other embodiments described herein, the echo channel self-interference signal provided as input to the RF combiner 222 is generated as baseband output of the channel model 210. Specifically, the channel model 210 receives baseband output from the buffer 206 and provides a baseband approximation of echo channel self-interference (based on current channel model parameters). This signal, in the baseband domain 202, is provided as input to an RF chain 226 that is tuned to Channel A. Specifically, the baseband signal is modulated into the RF domain 204a by a carrier defining the center frequency of Channel A.

Output of the domain conversion of the echo channel self-interference signal from baseband domain 202 to RF domain 204a can be provided to a tunable band pass filter 228. The tunable band pass filter 228 is tuned to Channel B. Output of the tunable band pass filter 228 is provided as input to the RF combiner 222 as described above. Optionally, output of the tunable band pass filter 228 can be controllably directed via a bidirectional switching element 230.

By contrast, during a receive interval, the first radio may be configured differently. In particular, bidirectional switching elements may be selectively operated so as to couple the antenna 218, through the coupler 216, to an RF chain 232 that converts received RF signals into baseband for subsequent processing and filtering by the channel model 210, described in greater detail below.

As noted above, the wireless communications relay 200 implements a symmetrical self-interference cancellation system. More specifically, the first radio and the second radio may be similarly or identically capable, operated in opposite modes at appropriate intervals. Specifically, in many cases, when the first radio is operated in a transmit mode the second radio may be operated in a receive mode. More particularly, especially in the context of time division duplexing or multiplexing, during a transmit interval of the first radio that overlaps with a receive interval of the second radio, self-interference cancellation operations as described herein can be performed.

In view of the foregoing, a person of skill in the art may appreciate that the second radio may be configured in a similar manner to the first radio as described above. In particular, as with the first radio, the second radio includes a buffer or other data store configured to receive, store, and output data associated with the second radio's operation. The data may be digital data received when the second radio is in a receive mode and/or digital data enqueued to be transmitted when the second radio is in a transmit mode. As may be appreciated, and as noted above, the buffer can be implemented in a number of suitable ways; generally and broadly, however, the buffer includes inputs and outputs configured for exchanging digital information serially or via a parallel interface.

In a transmit mode, the buffer is configured to provide a digital data stream as output. This data stream can be appropriately encoded or otherwise prepared for subsequent modulation and transmission. In the transmit mode, output of the buffer is split along two paths just as with the first radio. A first path is provided to a delay block and a second path is provided to the channel model 210. Once delayed, output of the delay block, still within the baseband domain 202, is provided as input to an RF chain 234 that (similar to the RF chain 212) filters, encodes, encrypts, modulates, or otherwise suitably prepares the baseband signal to transmission into the local RF environment. More simply, the RF chain 234 transitions the baseband output of the delay block from the baseband domain 202 to the RF domain 204b.

Output of the RF chain 234 can pass optionally through a bidirectional switch element 236 (optional in some embodiments), before being provided as input to a coupler 238 that in turn is conductively coupled to a feed line of an antenna or antenna array, identified as the antenna 240. As a result of this construction, the antenna 240 transmits an RF domain signal along Channel B that corresponds to data output from the buffer associated with the second radio. As with the coupler 216, the coupler 238 also serves as a tap within the RF domain 204b of signals broadcast by and transmitted from the antenna 240. As with the first radio, the tapped signal obtained from a secondary output of the coupler 238 can be provided as input (optionally) to a bidirectional switch element 242 that controllably directs the tapped signal toward an RF combiner 244.

As with the first radio, a secondary input of the RF combiner 244 may be configured to receive an RF domain expression of echo channel self-interference. In this manner, output of the RF combiner 244 can be considered a self-interference signal accounting for and/or otherwise representing the combination of direct interference and echo channel interference. The combined SIC signal output by the RF combiner 244 can be provide as input to an RF chain 246 for conversion back to the baseband domain 202, to be used by the channel model for tuning. The BB expression of combined direct interference and echo channel interference can in turn be provided to the channel model 210 as a reference signal representing expected self-interference that may be incident upon the first radio of the wireless communications relay 200.

As with the first radio, the echo channel self-interference signal provided as input to the RF combiner 244 is generated as baseband output of the channel model 210. Specifically, the channel model 210 receives baseband output from the second radio's buffer and provides a baseband approximation of echo channel self-interference resulting from signals being currently transmitted (by one or more antennas; it may be appreciated that in multiple-input multiple-output ("MIMO") configurations and others, MIMO layering may necessitate overlaying one or more transmit self-interference cancellation signals over one another to effectively cancel and/or approximate echo channel interference for each receive chain).

This signal is provided as input to an RF chain 248 that is tuned to Channel B when the second radio is in a transmit mode or Channel A when the second radio is in receive mode. Output of the domain conversion of the echo channel self-interference signal from baseband domain 202 to RF domain 204b can be provided to a tunable band pass filter 250 tuned to Channel A. Output of the tunable band pass filter 250 is provided as input to the RF combiner 244 as described above. Optionally, output of the tunable band pass filter 250 can be controllably directed via a bidirectional switching element 252.

As with the first radio, the second radio can be differently configured during a receive interval. In particular, bidirectional switching elements may be selectively operated so as to couple the antenna 240, through the coupler 238, to an RF chain 254 that converts received RF signals into baseband for subsequent processing and filtering by the channel model 210. After filtering by the channel model 210, filtered output can be provided as input to a buffer of the second radio, identified as the buffer 256. This may be the same buffer or a different buffer configured to hold and/or retrieve transmit data when the second radio is operated in a transmit mode. More specifically, the buffer 256 may be configured—in a transmit mode—to provide output to the channel model 210 and/or to a delay element 258, which in turn (as noted above) provides delayed output as input to the RF chain 234.

The wireless communications relay 200 can include one or more translators or bridges to facilitate bridging data between the buffer 256 and the buffer 206 to allow devices in communication with the first radio to communicate with devices (or otherwise exchange data with) devices in communication with the second radio. The bridge 260 can be configured to translate between different protocols or encodings, or may be a data bus. Many configurations are possible.

Further, although the schematic diagram of the wireless communications relay 200 is described in respect of a single pair of symmetrically-architected radios, it may be appreciated that any number of additional radios, arrays, channels or antennas can be incorporated as described herein. In such configurations, echo channel approximation can be associated with each transmitted signal and each received signal. More specifically, for each transmitted signal a respective additional set of delay blocks, channel model inputs and outputs, and RF chains may be included. These additional components are collectively represented by the element 262 as shown in FIG. 2.

These foregoing embodiments depicted in FIG. 2 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

However, as noted above, certain portions of the schematic shown in FIG. 2 may be disabled or otherwise unused in certain operational modes.

Figure 3:
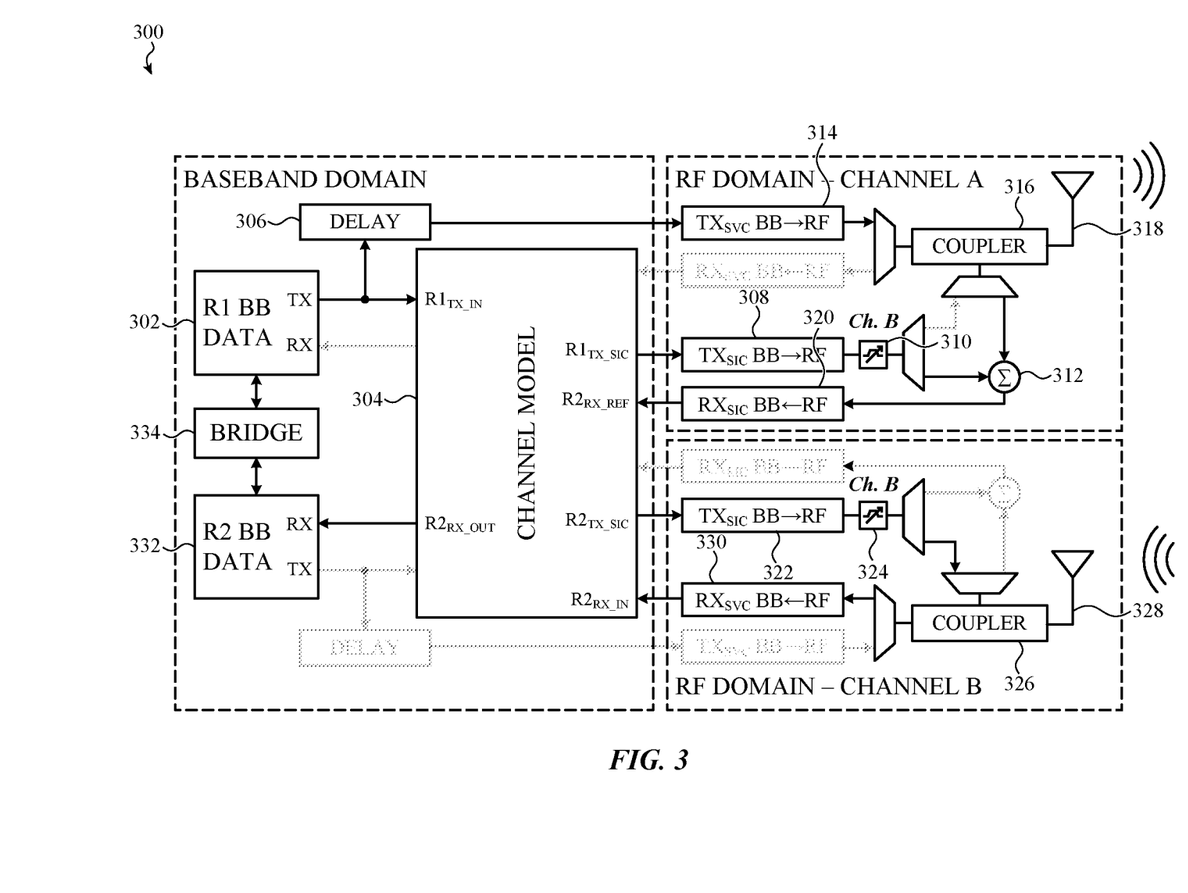
FIG. 3 is a system diagram of a wireless communications relay, as described herein, during a first-side transmit interval.

FIG. 3 is a system diagram of a wireless communications relay 300. The wireless communications relay 300, like the wireless communications relay 200 of FIG. 2, can be configured with two radios—a first radio and a second radio. In this example construction, the first radio is operated in a transmit mode and the second radio is operated in a receive mode. As with previous examples, the first and second radios can be configured to operate in adjacent bands. In particular, the first radio may be configured to operate in Channel A and the second radio may be configured to operate in Channel B.

Data to be transmitted by the first radio in Channel A to a remote device can be retrieved from or by a buffer 302. The buffer 302 provides output that is split along two paths. A first path is delayed, and a second path is provided as input to a channel model 304. The delayed path includes a delay element 306 configured to introduce a delay equivalent to processing time of the channel model 304.

As with other embodiments described herein, the channel model 304 can be configured to generate a baseband approximation of echo channel self-interference. The channel model 304 provides the baseband approximation as input to an RF chain 308 tuned to Channel A to shift the baseband approximation into the RF domain. This RF domain expression of echo channel self-interference can be provided as input to a band pass filter 310 tuned to Channel B. The filtered output of the band pass filter 310 is provide as input an RF combiner 312. As with other embodiments described herein, the RF combiner 312 can combine the RF domain expression of echo channel self-interference with a tapped sample of the actual signal broadcast by the first radio. More specifically, the delayed output from the delay element 306 can be provided as input to an RF chain 314 tuned to Channel A. This RF domain signal output from the RF chain 314 can be provided as input to a coupler 316 that in turn feeds an antenna 318 for transmitting into the local RF environment.

The coupler 316 in this manner effectively taps the transmitted signal and provides that tapped signal as input to the RF combiner 312 for combination with the filtered RF domain expression of the echo channel self-interference.

The combined output of the RF combiner 312 can be provided as input to an RF chain 320 tuned to Channel A. The RF chain 320 in this manner provides a baseband reference signal to the channel model 304 for subtraction from signals received from the second radio.

As noted above, the second radio in this example embodiment and configuration is operated in a receive mode. The second radio receives, like the first radio, a baseband approximation of echo channel effects. This approximation may be provided as input to an RF chain 322 tuned to Channel A and subsequently filtered by a band pass filter 324 tuned to Channel B. This output (an RF domain expression of a Channel B-specific portion of echo channel self-interference attributed to transmission of the signal(s) transmitted by the first radio into the local RF environment) is thereafter provided as input to a coupler 326 that is likewise coupled to an antenna 328, thereby counteracting environmental echo channel self-interference with the approximated echo channel self-interference generated by the channel model 304.

After combining the cancellation signal with received signals via the coupler 326, the resulting signal can be converted to baseband by operation of another, identified as the RF chain 330. This baseband signal can be provided as input the channel model which can leverage the reference signal received from the RF chain 320 to subtract direct interference as well and/or for real-time tuning of the channel model itself. More specifically, the channel model 304 can compare input received from the RF chain 330 to input receive from the RF chain 320 to update echo channel parameters.

In other words, the channel model 304 can update internal channel parameters by correlating strings of known-transmitted symbols (e.g., symbols output by the buffer 302 and transmitted from the antenna 318 into the local RF environment to amplitudes and phase shifts observed in the baseband signal received from the RF chain 330. In this manner, as the channel model 304 continues to operate, error in the channel model may reduce, more closely representing the actual echo channel characteristics introduced by the local RF environment. Further still, as may be appreciated by a person of skill in the art, the output of the RF chain 330 can be leveraged for fast responsiveness to changes in the local RF environment, such as may be introduced by a user equipment in communication with the antenna 318 or the antenna 328 changing position.

Once post-processing has been completed by the channel model 304, the channel model 304 can provide digital symbol output to a receive-side/second radio buffer 332 which may couple back to the buffer 302 via a communications/protocol bridge 334.

These foregoing embodiments depicted in FIG. 3 and the various alternatives thereof and variations thereto are presented, generally, for purposes of explanation, and to facilitate an understanding of various configurations and constructions of a system in which a first radio is operated in a transmit mode and a second radio is operated in a receive mode, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 4:
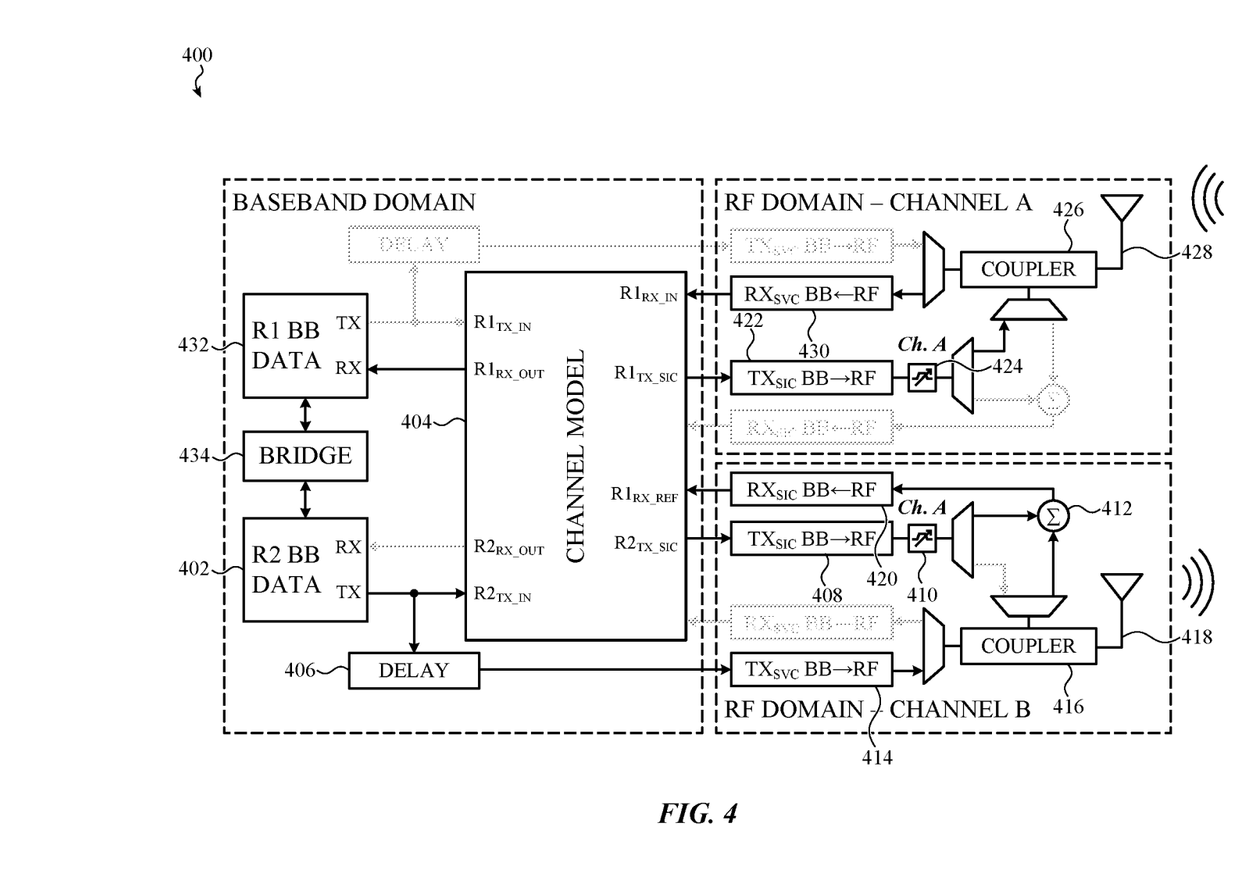
FIG. 4 is a system diagram of a wireless communications relay, as described herein, during a second-side transmit interval.

FIG. 4 is a system diagram of a wireless communications relay 400 that correlates to the wireless communications relay 300 of FIG. 3. As with other embodiments described herein, the wireless communications relay 400 can be configured with two radios—a first radio and a second radio. In this example construction, the second radio is operated in a transmit mode and the first radio is operated in a receive mode. As with previous examples, the first radio may be configured to operate in Channel A and the second radio may be configured to operate in Channel B.

As with other embodiments described herein, data to be transmitted by the second radio in Channel B to a remote device can be retrieved from or by a buffer 402. The buffer 402 provides output that is split along two paths. A first path is delayed, and a second path is provided as input to a channel model 404. The delayed path includes a delay element 406 configured to introduce a delay equivalent to processing time of the channel model 404.

The channel model 404 can be configured to generate a baseband approximation of echo channel self-interference. The channel model 404 provides the baseband approximation as input to an RF chain 408 tuned to Channel B to shift the baseband approximation into the RF domain. This RF domain expression of echo channel self-interference can be provided as input to a band pass filter 410 tuned to Channel A.

The filtered output of the band pass filter 410 is provide as input an RF combiner 412. As with other embodiments described herein, the RF combiner 412 can combine the RF domain expression of echo channel self-interference with a tapped sample of the actual signal broadcast by the first radio. More specifically, the delayed output from the delay element 406 can be provided as input to an RF chain 414 tuned to Channel B. This RF domain signal output from the RF chain 414 can be provided as input to a coupler 416 that in turn feeds an antenna 418 for transmitting into the local RF environment.

The coupler 416 in this manner effectively taps the transmitted signal and provides that tapped signal as input to the RF combiner 412 for combination with the filtered RF domain expression of the echo channel self-interference.

The combined output of the RF combiner 412 can be provided as input to an RF chain 420 tuned to Channel B. The RF chain 420 in this manner provides a baseband reference signal to the channel model 404 for subtraction from signals received from the second radio.

The first radio in this example embodiment and configuration is operated in a receive mode. The first radio receives, like the second radio, a baseband approximation of echo channel effects. This approximation may be provided as input to an RF chain 422 tuned to Channel A and subsequently filtered by a band pass filter 424 tuned to Channel B. This output (an RF domain expression of a Channel A-specific portion of echo channel self-interference attributed to transmission of the signal(s) transmitted by the second radio into the local RF environment) is thereafter provided as input to a coupler 426 that is likewise coupled to an antenna 428, thereby counteracting environmental echo channel self-interference with the approximated echo channel self-interference generated by the channel model 404.

After combining the cancellation signal with received signals via the coupler 426, the resulting signal can be converted to baseband by operation of another RF chain 430. This baseband signal can be provided as input the channel model which can leverage the reference signal received from the RF chain 420 to subtract direct interference as well. In addition, the channel model 404 can compare input received from the RF chain 430 to input receive from the RF chain 420 to update echo channel parameters.

In other words, the channel model 404 can update internal channel parameters by correlating strings of known-transmitted symbols (e.g., symbols output by the buffer 402 and transmitted from the antenna 418 into the local RF environment to amplitudes and phase shifts observed in the baseband signal received from the RF chain 430. In this manner, as the channel model 404 continues to operate, error in the channel model may reduce, more closely representing the actual echo channel characteristics introduced by the local RF environment. Once post-processing has been completed by the channel model 404, the channel model 404 can provide digital symbol output to a receive-side/first radio buffer 432 which may couple back to the buffer 402 via a communications/protocol bridge 434.

These foregoing embodiments depicted in FIG. 4 and the various alternatives thereof and variations thereto are presented, generally, for purposes of explanation, and to facilitate an understanding of various configurations and constructions of a system in which a second radio is operated in a transmit mode and a first radio is operated in a receive mode, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
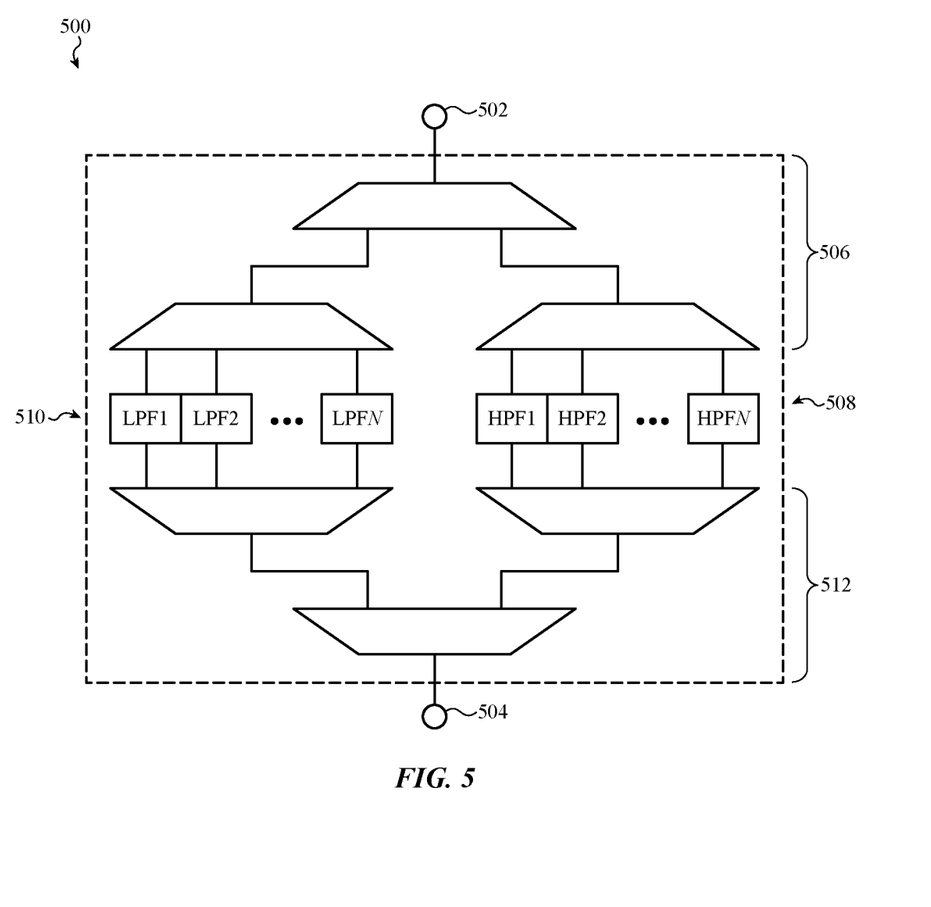
FIG. 5 is a simplified schematic diagram of a configurable band pass filter.

FIG. 5 is a simplified schematic diagram of a configurable band pass filter that may be used with a wireless communications relay as described herein. The band pass filter 500 includes an input 502 and an output 504. A signal applied to the input 502 can be distributed by a cascading set of switches 506 that in turn select a respective one high pass filters from a set of high pass filters 508 and a respective one low pass filter from a set of low pass filters 510. The selected high pass filter and the selected low pass filter can be paired so as to overlap and define a band pass filter centered at a desired frequency. Output from the selected high pass and low pass filters can be provided as input to a set of selectable switches and/or RF combiners 512. In this manner and as a result of this construction, an RF signal applied to the input 502 can be band pass filtered when output from the output 504.

Figure 6:
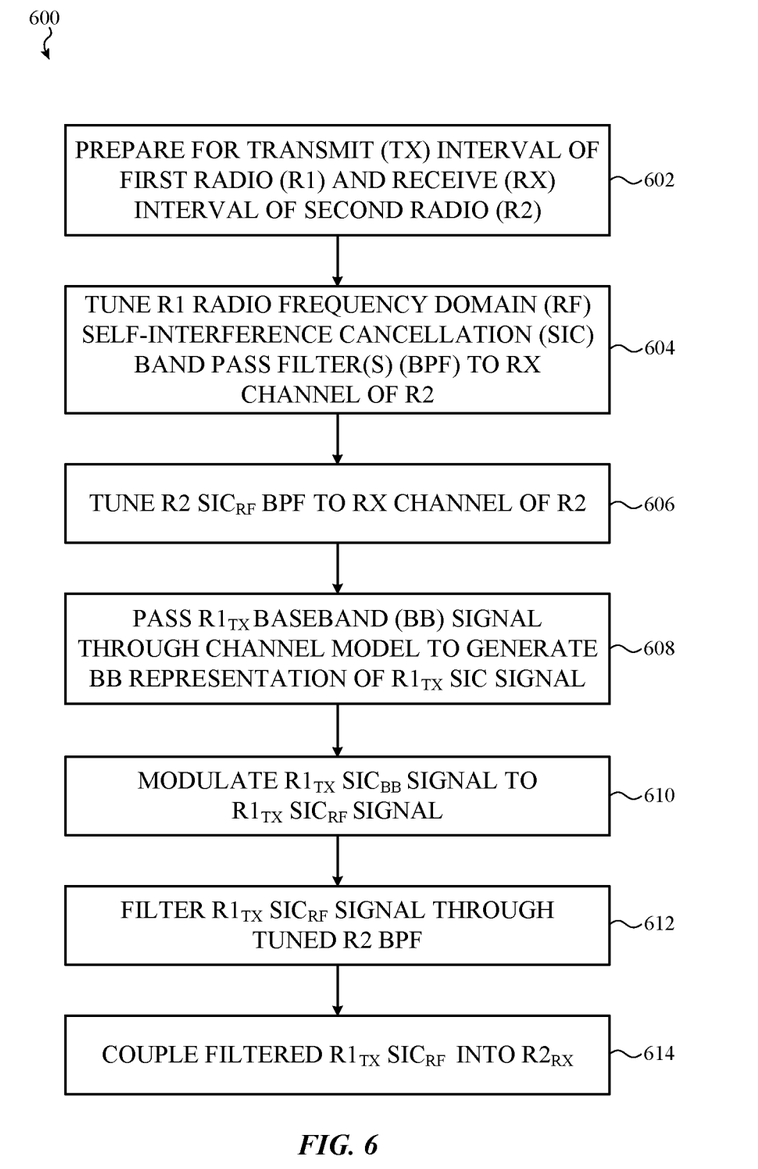
FIG. 6 is a flowchart depicting example operations of a method of operating a wireless communications relay.

FIG. 6 is a flowchart depicting example operations of a method of operating a wireless communications relay. The method 600 includes operation 602 at which the wireless communications relay prepares for a transmit interval of a first radio to overlap with a receive interval of a second radio. At operations 604 and 606, respective band pass filters of the first and second radios (such as those described in references to FIGS. 2-5) can be tuned to a channel associated with the second radio. Next, at operation 608, a channel model can be leveraged to generate a baseband representation/approximation of echo channel effects anticipated in respect of a particular input transmit signal to be transmitted by the first radio.

At operation 610, the baseband approximation can be modulated to the RF domain by an RF chain tuned to a channel associated with the first radio. Next at operation 612, the RF domain expression of the baseband echo channel approximation can be filtered by a band pass filter tuned at operations 604 or 606. Finally at operation 614, the filtered RF domain expression of the approximated echo channel self-interference can be coupled into a receive signal antenna feed associated with the second radio.

Figure 7:
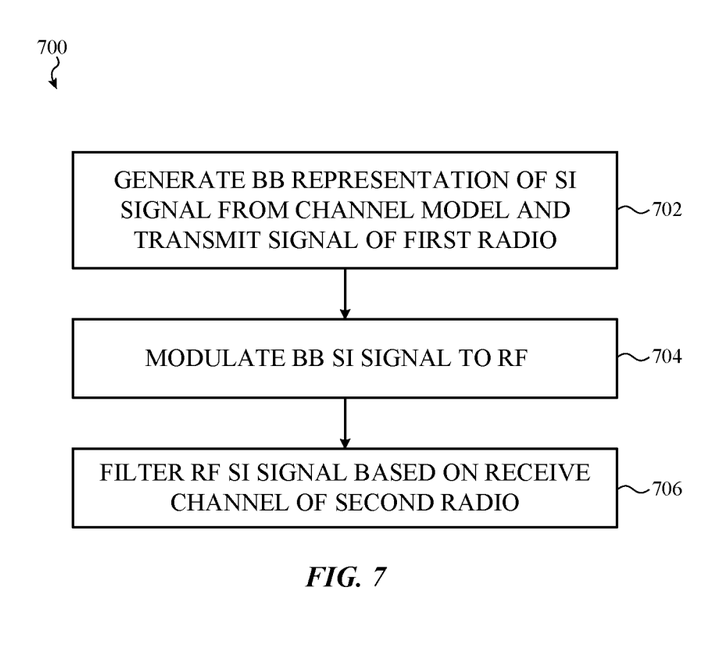
FIG. 7 is a flowchart depicting example operations of a method of cancelling self-interference in a wireless communications relay.

FIG. 7 is a flowchart depicting example operations of a method of cancelling self-interference in a wireless communications relay. The method 700 includes operation 702 at which a baseband approximation/representation of self-interference can be generated from a channel model. This signal can be generated by operation of a channel model, as described above. At operation 704, the baseband echo channel self-interference signal can be transitioned to the RF domain. Thereafter, at operation 706, the RF domain expression of the echo channel self-interference signal can be filtered based on a band of a nearby or otherwise co-located receive mode radio.

Figure 8:
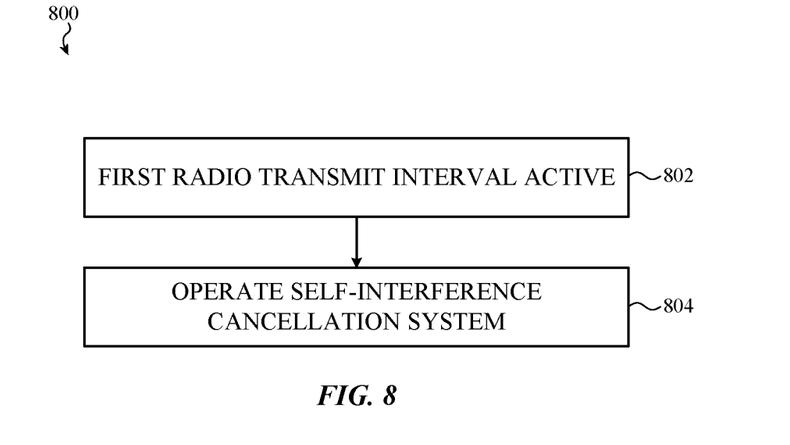
FIG. 8 is a flowchart depicting example operations of a method of selectively activating a self-interference cancellation subsystem.

FIG. 8 is a flowchart depicting example operations of a method of selectively activating a self-interference cancellation subsystem. The method 800 includes operation 802 at which a first radio of a pair of radios enters a transmit interval. In response, operation 804 causes operation of a self-interference cancellation subsystem. As may be appreciated, this method may save significant power in a wireless communications relay; self-interference cancellation functionality may only be leveraged when required.

These foregoing embodiments depicted in FIGS. 1-8 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects, and functionality described in one or more of the individual embodiments are not limited in their applicability to the particular embodiment with which they are described, but instead can be applied, alone or in various combinations, to one or more of the embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

As noted above, a signal generator and/or photonic circuit or optical circuit such as described herein can be incorporated into any suitable computing device or computing resource. As used herein, the term "computing resource" (along with other similar terms and phrases, including, but not limited to, "computing device" and "computing network") refers to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

What is claimed is:
1. A wireless relay device comprising:
a channel model;
a first radio configured to communicate over a first channel, the first radio comprising:
    a first antenna;
    a buffer configured to provide as output a first baseband signal;

a first RF chain configured to transition the first baseband signal to RF domain to transmit via the first antenna;

a second RF chain configured to receive a second baseband signal as input from the channel model, the second baseband signal comprising a first approximation of echo channel self-interference effects introduced by a local RF environment, the second RF chain configured to transition the second baseband signal to RF domain; and a first band pass filter coupled to the second RF chain and tuned to a second channel different from the first channel, output of the first band pass filter provided as a reference signal to the channel model; and a second radio configured to communicate over the second channel, the second radio comprising:

a second antenna configured to receive over the second channel;

a third RF chain receiving a third baseband signal as input from the channel model, the third baseband signal comprising a second approximation of echo channel self-interference effects introduced by the local RF environment, the third RF chain configured to transition the third baseband signal to RF domain; and a second band pass filter coupled to the third RF chain and tuned to the second channel, output of the second band pass filter coupled to the second antenna to attenuate echo channel self-interference.

2. The wireless relay device of claim 1, wherein output of the buffer is split between:

a first path comprising a delay element; and a second path coupled to the channel model.

3. The wireless relay device of claim 2, wherein the first RF chain is configured to receive input from the delay element.

4. The wireless relay device of claim 3, wherein the delay element is configured to provide a delay equivalent to a processing delay incurred by the channel model.

5. The wireless relay device of claim 1, wherein the first RF chain, the second RF chain, and the third RF chain are tuned to the first channel.

6. The wireless relay device of claim 1, wherein the first channel and the second channel are adjacent channels.

7. The wireless relay device of claim 1, wherein the first channel is associated with a first wireless communication protocol and the second channel is associated with a second wireless communication protocol.

8. The wireless relay device of claim 7, wherein the first and second wireless communication protocols are cellular communication protocols.

9. The wireless relay device of claim 1, wherein the second approximation of echo channel self-interference effects is based at least in part on the first approximation of echo channel self-interference effects.

10. The wireless relay device of claim 1, wherein the third RF chain is coupled to the second antenna via a bidirectional coupler.

11. A wireless device comprising:

a channel model;

a first radio operated in a transmit mode and configured to communicate over a first channel; and a second radio operated in a receive mode and configured to communicate over a second channel, the second radio comprising:

an antenna configured to receive over the second channel;

a first RF chain receiving a first baseband signal as input from the channel model, the baseband signal comprising an approximation of echo channel self-interference effects introduced by operation of the first radio within a local RF environment, the first RF chain configured to transition the first baseband signal to RF domain on the first channel;

a band pass filter coupled to the first RF chain and tuned to the second channel;

a coupler coupling output of the band pass filter and the antenna, thereby attenuating echo channel self-interference introduced by operation of the first radio; and a second RF chain coupled to output of the coupler, the second RF chain tuned to the second channel and configured to provide as output a second baseband signal.

12. The wireless device of claim 11, wherein the wireless device is a cellular relay.

13. The wireless device of claim 12, wherein the first radio is communicably coupled to a core network via backhaul and the second radio is communicably coupled to a user equipment device.

14. The wireless device of claim 11, wherein the channel model is implemented at least in part by a field programmable gate array.

15. The wireless device of claim 11, wherein the antenna is a member of a set of antennas associated with the second radio.

16. The wireless device of claim 11, wherein the band pass filter is a tunable band pass filter configured to tune to at least the second channel and the first channel.

17. A method of cancelling self-interference in a wireless relay device comprising:

configuring a first radio of the wireless relay device to operate in a transmit mode;

configuring a second radio of the wireless relay device to operate in a receive mode;

tuning RF chains of the first radio to a first channel;

tuning at least one RF chain of the second radio to the first channel;

generating by operation of a channel model a baseband approximation of self-interference attributable to operation of the first radio;

operating the at least one RF chain of the second radio to shift the baseband approximation of self-interference to RF domain;

operating a band pass filter to extract frequency components of the RF domain baseband approximation that overlap with the second channel; and combining output of the band pass filter with output of an antenna of the second radio so as to attenuate self-interference introduced by operation of the first radio.

18. The method of claim 17, wherein the first channel and the second channel are adjacent channels.

19. The method of claim 17, wherein the approximation of self-interference comprises both echo channel self-interference and direct self interference components.

20. The method of claim 17, comprising tuning the band pass filter to the second channel.

* * * * *